US012633626B2

(12) United States Patent
Xie et al.

(10) Patent No.: US 12,633,626 B2
(45) Date of Patent: May 19, 2026

(54) BATTERY CELL COMPRISING INSULATING MEMBER COVERING TAB, BATTERY, AND ELECTRIC APPARATUS

(71) Applicant: CONTEMPORARY AMPEREX TECHNOLOGY CO., LIMITED, Ningde (CN)

(72) Inventors: Yongfeng Xie, Ningde (CN); Jian Zhou, Ningde (CN); Liqin Wang, Ningde (CN); Quankun Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/321,313

(22) Filed: Sep. 8, 2025

(65) Prior Publication Data

US 2026/0005410 A1      Jan. 1, 2026

Related U.S. Application Data

(63) Continuation of application No. PCT/CN2024/097206, filed on Jun. 4, 2024.

(30) Foreign Application Priority Data

Sep. 28, 2023     (CN) ........................ 202322661304.X

(51) Int. Cl.
*H01M 50/533*       (2021.01)
*H01M 50/536*       (2021.01)
*H01M 50/593*       (2021.01)

(52) U.S. Cl.
CPC ....... *H01M 50/533* (2021.01); *H01M 50/536* (2021.01); *H01M 50/593* (2021.01); *H01M 2220/20* (2013.01)

(58) Field of Classification Search
CPC ............. H01M 50/533; H01M 50/536; H01M 50/593; H01M 2220/20
See application file for complete search history.

(56) References Cited

U.S. PATENT DOCUMENTS

2022/0216574 A1      7/2022  Bai

FOREIGN PATENT DOCUMENTS

| CN | 216488411 U | 5/2022 |
|---|---|---|
| CN | 216750230 U | 6/2022 |

(Continued)

OTHER PUBLICATIONS

International Search Report in the international application No. PCT/CN2024/097206, dated Aug. 5, 2024, 8 pages with English translation.

(Continued)

*Primary Examiner* — Kimberly Wyluda
(74) *Attorney, Agent, or Firm* — K&L Gates LLP

(57)     ABSTRACT

A battery cell includes an electrode extraction portion configured to extract electric energy, and an electrode assembly comprising a main body and a tab. The tab includes a transition portion and a connection portion, with the connection portion bent relative to the transition portion. The transition portion connects the main body to the connection portion, and the connection portion is configured for connection to the electrode extraction portion. An insulating member is disposed on an inner side of the bent tab and includes a first insulator fixed to the main body, a third insulator fixed to the connection portion, and a second insulator disposed between the first and third insulators. At least a portion of the transition portion is not fixed to the insulating member. A battery and an electric apparatus incorporating the battery cell are also disclosed.

14 Claims, 8 Drawing Sheets

(56)  References Cited

FOREIGN PATENT DOCUMENTS

| | | | |
|----|--------------|---|----------|
| CN | 115458879 | A | 12/2022 |
| CN | 218414960 | U | 1/2023 |
| CN | 218498208 | U | 2/2023 |
| CN | 116799277 | A | 9/2023 |
| EP | 3 989 352 | A1 | 4/2022 |
| JP | 2019117738 | A | 7/2019 |

OTHER PUBLICATIONS

ISA Written Opinion in the international application No. PCT/CN2024/097206, dated Aug. 5, 2024, 8 pages with English translation.
The extended European search report received in the corresponding EP Application No. 24869825.0, dated Apr. 16, 2026, 7 pages.

1

100

20

214 { 214a
      214b

212

213

24

221a
221
221b

22

211

BATTERY CELL COMPRISING INSULATING MEMBER COVERING TAB, BATTERY, AND ELECTRIC APPARATUS

CROSS-REFERENCE TO RELATED APPLICATIONS

The present application is a continuation of International Application No. PCT/CN2024/097206, filed Jun. 4, 2024, which claims priority to Chinese Patent Application No. 202322661304.X, filed on Sep. 28, 2023 and entitled "Battery Cell, Battery, and Electric Apparatus", which is incorporated herein by reference in its entirety.

TECHNICAL FIELD

The present application relates to the field of batteries, and in particular, to a battery cell, a battery, and an electric apparatus.

BACKGROUND

At present, a secondary battery mainly includes a housing and an electrode assembly provided in the housing, the housing is provided with an electrode terminal, the electrode assembly is provided with a tab which is electrically connected to the electrode terminal. In the related art, an insulating member is covered on the tab to protect the tab. However, the tab may be torn after the insulating member is covered, and therefore, how to reduce tab tearing has become a new subject matter.

SUMMARY

In view of this, embodiments of the present application provide a battery cell, a battery, and an electric apparatus, to help resolve a problem of tab tearing caused by an adhesive force between an insulating member and a tab when the tab is bent.

According to a first aspect, a battery cell is provided, which includes an electrode extraction portion configured to extract electric energy of the battery cell, an electrode assembly including a main body and a tab, where the tab includes a transition portion and a connection portion, the connection portion is bent relative to the transition portion which is connected between the main body and the connection portion, the connection portion is configured to be connected to the electrode extraction portion; and an insulating member provided on an inner side of the bent tab, where the insulating member includes a first insulator fixed to the main body and a third insulator fixed to the connection portion, the insulating member further includes a second insulator connected between the first insulator and the third insulator, and at least a part of the transition portion is not fixed to the insulating member.

In the present embodiment of the present application, the second insulator is provided between the first insulator and the third insulator to connect the first insulator and the third insulator, so that connection strength between the first insulator and the third insulator on the electrode assembly can be improved, and a risk of detachment can be reduced. In addition, by not fixing at least a part of the transition portion from the tab to the insulating member, tensile force of the insulating member on the tab can be reduced during the bending process of the tab, which is beneficial to reduce tab tearing during the bending of the tab.

In a possible implementation, at least a part of the transition portion is not fixed to the second insulator.

In the present embodiment, at least a part of the transition portion of the tab is not fixed to the second insulator, so that the tab can release stress during the bending process of the tab, thereby reducing the tensile force applied by the insulating member to the tab, and reducing the risk of breakage of the tab.

In a possible implementation, the transition portion includes a first portion and a second portion, the first portion is connected to the main body, the second portion is connected between the connection portion and the first portion, an inner surface of the second portion is bent relative to an inner surface of the first portion, and the second portion is not fixed to the second insulator.

In the present embodiment, since the connection of the second portion with the connection portion and the first portion are all bending points, by arranging the second portion not to be fixed to the second insulator, the tensile force of the insulating member on the bending portion of the tab can be released as much as possible, and the risk of tearing the tab when the tab is bent can be reduced as much as possible.

In a possible implementation, a first edge portion of the first portion that is connected to the second portion is not fixed to the second insulator, and/or a second edge portion of the connection portion that is connected to the second portion is not fixed to the second insulator.

In the present embodiment, not only the second portion is configured not to be fixed to the second insulator, but also the first edge portion of the first portion connected to the second portion is configured not to be fixed to the second insulator, and/or the second edge portion of the connection portion connected to the second portion is configured not to be fixed to the second insulator, which can better release the tensile force applied by the insulating member to the tab, and reduce the risk of breakage of the tab.

In a possible implementation, all the transition portions are not fixed to the second insulator.

In the present embodiment, by arranging the entire transition portion not to be fixed to the second insulator, the tensile force applied by the insulating member to the tab can be released more during the bending process of the tab, and the risk of breakage of the tab is reduced.

In a possible implementation, the connection portion and the electrode extraction portion are welded and form a welding region exposed to a side of the connection portion near the main body, and the third insulator covers the welding region.

In the present embodiment, the third insulator is configured to cover the welding region, so that the third insulator can fix the metal debris in the welding region at the welding region, which is beneficial to reducing the probability of short circuit of the battery cell caused by escape of the metal debris.

In a possible implementation, the third insulator exceeds the welding region.

In the present embodiment, the third insulator is configured to exceed the welding region, the metal debris in the welding region can be enclosed in the welding region, thereby reducing the probability of short circuit of the battery cell caused by escape of the metal debris.

In a possible implementation, the tab extends from a first end face of the main body, the first insulator is provided at a first connection at intervals, and the first connection is a connection between an inner surface of the tab and the first end face.

In the present embodiment, since the first connection is a stress concentration point between the tab and the main body, the first insulator is spaced apart from the first connection, so that the first connection can be covered by the second insulator and is not fixed to the insulating member, thereby reducing the tensile force applied by the insulating member to the first connection during the bending of the tab, and further reducing the risk of breakage of the tab.

In a possible implementation, a distance between the first insulator and the first connection is greater than or equal to 2 mm.

In the present embodiment, by arranging the distance between the first insulator and the first connection to be greater than or equal to 2 mm, the tensile force applied by the insulating member to the tab can be further reduced, thereby reducing the risk of breakage of the tab.

In a possible implementation, in a first direction, the size of the first insulator fixed to a first side face of the main body is less than the size of a coating thinned region of an electrode plate in the electrode assembly, the first side face is perpendicular to the first end face, the first direction is perpendicular to the first end face, and the first end face is an end face of the main body that is connected to the tab.

In the present embodiment, in the first direction, the size of the first insulator fixed to the first side face of the main body is set to be smaller than the size of the coating thinned region of the electrode plate in the electrode assembly, which can reduce the influence of the attachment of the insulating member on the performance of the battery cell.

In a possible implementation, the first insulator includes a first insulating layer and a first adhesive coating, the third insulator includes a third insulating layer and a third adhesive coating, the first insulating layer is bonded to the main body by using the first adhesive coating, the third insulating layer is bonded to the connection portion by using the third adhesive coating, the second insulator includes a second insulating layer, and a surface of the second insulating layer facing the tab is exposed.

In the present embodiment, by exposing the surface of the second insulating layer facing the tab, it can be achieved that at least a part of the transition portion of the tab is not fixed to the second insulator, thereby reducing the tensile force applied by the insulating member to the tab during the bending process of the tab, and reducing the risk of breakage of the tab. In addition, the material used for the adhesive coating can be reduced, and the cost can be reduced.

In a possible implementation, the first insulator includes a first insulating layer and a first adhesive coating, the second insulator includes a second insulating layer and a second adhesive coating, the third insulator includes a third insulating layer and a third adhesive coating, the second insulator further includes a fourth insulating layer which is bonded to the second insulating layer by using the second adhesive coating, and a surface of the fourth insulating layer facing the tab is exposed.

In the present embodiment, by bonding the fourth insulating layer to the second adhesive coating and exposing the surface of the fourth insulating layer facing the tab, it can be achieved that the portion of the tab from the first connection to the second connection is not fixed to the insulating member, thereby reducing the tensile force applied by the insulating member to the tab during the bending process of the tab, and reducing the risk of breakage of the tab. In addition, it is only necessary to paste the fourth insulating layer at a position corresponding to the tab from the first connection to the second connection, which reduces the manufacturing complexity of the insulating member.

In a possible implementation, the electrode extraction portion includes an electrode terminal, and the electrode terminal is welded to the connection portion, or the electrode extraction portion includes an electrode terminal and a connection member, the connection portion is electrically connected to the electrode terminal through the connection member, and the connection portion is welded to the connection member.

In the present embodiment, the electrode terminal is directly welded to the connection portion without being connected by the connection member, which can improve the space utilization of the battery cell while reducing the cost. In addition, the connection portion is connected to the electrode terminal through the connection member, which facilitates the connection between the tab and the electrode terminal.

In a possible implementation, the electrode extraction portion is provided on a first wall of a housing of the battery cell, the tab extends from a first end face of the electrode assembly, and the first end face is provided opposite to the first wall.

In the present embodiment, by providing the electrode extraction portion on the first wall opposite to the first end face, the space occupied by the tab can be greatly saved.

In a second aspect, provided is a battery including a battery cell as provided in the first aspect.

In a third aspect, provided is an electric apparatus including the battery of the second aspect which is used for providing electric energy to the electric apparatus.

DESCRIPTION OF DRAWINGS

In order to more clearly illustrate the technical solutions of the embodiments of the present application, the drawings required to be used in the embodiments of the present application will be briefly introduced below. Obviously, the drawings described below are only some embodiments of the present application. For persons of ordinary skill in the art, other drawings can also be obtained from the drawings without creative work.

5

6

Figures 10, 11:
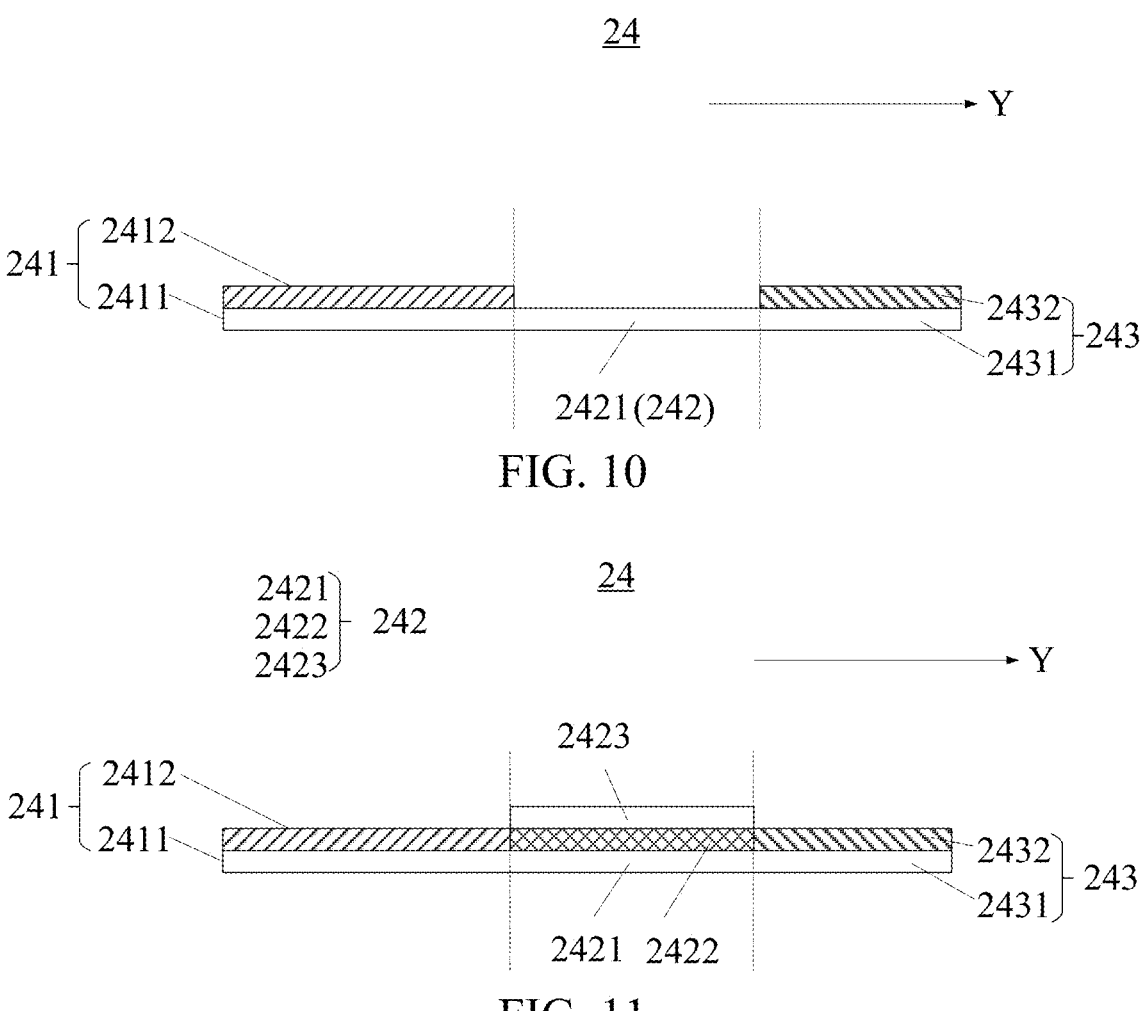
FIG. 10 is a schematic cross-sectional view of an insulating member in an unfolded state according to an embodiment of the present application.

FIG. 11 is a schematic cross-sectional view of another insulating member in an unfolded state according to an embodiment of the present application.

DESCRIPTION OF REFERENCE SIGNS 1 vehicle; 80 motor; 60 controller; 100 battery; 111 first box portion; 112 second box portion; 20 battery cell; 211 case; 212 cover plate; 22 electrode assembly; 23 connection member; 24 insulating member; 214 electrode terminal; 214a positive electrode terminal; 214b negative electrode terminal; 221 tab; 221a first tab; 221b second tab; 222 main body; 2221 first end face; 2222 first side face; 2211 transition portion; 2212 connection portion; 201 electrode extraction portion; 202 welding region; 203 first connection; 204 second connection; 241 first insulator; 242 second insulator; 243 third insulator; 2411 first insulating layer; 2412 first adhesive coating; 2421 second insulating layer; 2422 second adhesive coating; 2431 third insulating layer; 2432 third adhesive coating; 2423 fourth insulating layer; 2301 first portion; 2302 second portion; 401 second portion inner surface; 402 first portion inner surface; 403 first edge portion; 404 second edge portion; 2223 second side face; 405 inner surface of tab; 251 current collector; 252 active material; X first direction; Y deployment direction of insulating member.

DESCRIPTION OF EMBODIMENTS

To make the objectives, technical solutions, and advantages of embodiments of the present application clearer, the following clearly describes the technical solutions in embodiments of the present application with reference to the accompanying drawings in the embodiments of the present application. Clearly, the described embodiments are some but not all of the embodiments of the present application. All other embodiments obtained by a person of ordinary skill in the art based on the embodiments of the present application without making creative efforts shall fall within the protection scope of the present application.

Unless defined otherwise, all technical and scientific terms used herein have the same meaning as commonly understood by a person skilled in the art to which the present application belongs; the terms used herein are used for describing particular embodiments only and are not intended to limit the present application; and the terms "including", "including", and "having" and any variations thereof in the description, claims and the above drawings of the present application are intended to cover non-exclusive inclusion. The terms "first", "second", and the like in the specification and claims of the present application or in the accompanying drawings are used to distinguish between different objects, and are not used to describe a specific sequence or a primary-secondary relationship.

The orientation words appearing in the following description are all directions shown in the drawings, and do not limit the specific structure in the present application. In the description of the present application, it should be further noted that, unless explicitly specified and defined otherwise, the terms "mounted", "connected", and "connect" are to be understood in a broad sense, for example, may be fixedly connected, detachably connected, or integrally connected, may be directly connected, or may be indirectly connected through an intermediate medium. Those of ordinary skill in the art may understand specific meanings of these terms in the present application according to specific situations.

An "embodiment" in the present application means that a specific feature, structure, or characteristic described with reference to the embodiment may be included in at least one embodiment of the present application. The phrase in various places in the description does not necessarily all refer to the same embodiment, or a separate or alternative embodiment mutually exclusive of other embodiments. A person skilled in the art explicitly and implicitly understands that the described embodiments in the present application may be combined with another embodiment.

The term "and/or" in this application is only an associative relationship for describing associated objects, indicating that three relationships may be present. For example, A and/or B may indicate three cases: presence of only A; presence of both A and B; and presence of only B. In addition, the symbol "/" in the present application generally represents an "or" relationship between associated objects.

In the present application, "multiple" means more than two (inclusive). Similarly, "multiple groups" means more than two (inclusive) groups, and "multiple pieces" means more than two (inclusive) pieces.

In the embodiments of the present application, the battery cell may be a secondary battery, and the secondary battery refers to a battery cell that may be continuously used by activating an active material by charging the battery cell after discharging thereof.

The battery cell may be a lithium ion battery, a sodium ion battery, a sodium-lithium ion battery, a lithium metal battery, a sodium metal battery, a lithium-sulfur battery, a magnesium ion battery, a nickel-hydrogen battery, a nickel-cadmium battery, a lead-acid battery, or the like, without limitation for the battery cell in the embodiments of the present application.

The battery cell generally includes an electrode assembly. The electrode assembly includes a positive electrode, a negative electrode, and a spacer. During charge and discharge of the battery cell, intercalation/de-intercalation of active ions (e.g., lithium ions) are enabled at the positive electrode and negative electrode by moving the active ions between the positive electrode and negative electrode. The spacer is provided between the positive electrode and the negative electrode to prevent the positive and negative electrodes from being short-circuited and to allow active ions to pass therethrough.

In some embodiments, the positive electrode and negative electrode may be a positive electrode plate which may include a positive current collector and a positive active material provided on at least one surface of the positive current collector.

As an example, the positive current collector has two surfaces opposite in its own thickness direction, and the positive active material is provided on either one or both of the two opposite surfaces of the positive current collector.

As an example, for the positive current collector, a metal foil or a composite current collector may be employed. For example, as the metal foil, aluminum or stainless steel which is subjected to surface treatment by silver, stainless steel, copper, aluminum, nickel, carbon electrode, carbon, nickel, titanium, or the like can be employed. The composite current collector may include a high-molecular material base layer and a metal layer. The composite current collector may be formed by forming a metal material (aluminum, an aluminum alloy, nickel, a nickel alloy, titanium, a titanium alloy, silver, a silver alloy, or the like) on a substrate of a high-molecular material (a substrate of polypropylene, polyethylene terephthalate, polybutylene terephthalate, polystyrene, polyethylene, or the like).

As an example, the positive active material may include at least one of a lithium-containing phosphate, a lithium-transition metal oxide, and respective modified compounds thereof.

In some embodiments, the negative electrode may be a negative electrode plate that may include a negative current collector.

As an example, for the negative current collector, a metal foil or a composite current collector may be employed. For example, as the metal foil, aluminum or stainless steel which is subjected to surface treatment by silver, stainless steel, copper, aluminum, nickel, carbon electrode, carbon, nickel, titanium, or the like can be employed. The composite current collector may include a high-molecular material base layer and a metal layer. The composite current collector may be formed by forming a metal material (copper, a copper alloy, nickel, a nickel alloy, titanium, a titanium alloy, silver, a silver alloy, or the like) on a substrate of a high-molecular material (a substrate of polypropylene, polyethylene terephthalate, polybutylene terephthalate, polystyrene, polyethylene, or the like).

As an example, the negative electrode plate may include a negative current collector and a negative active material provided on at least one surface of the negative current collector.

As an example, for the negative active material, a negative active material which is known in the art for a battery cell may be used. As an example, the negative electrode active material may include at least one of the following materials: synthetic graphite, natural graphite, soft carbon, hard carbon, a silicon-based material, a tin-based material, lithium titanate, and the like.

In some embodiments, the material of the positive current collector may be aluminum and the material of the negative current collector may be copper.

In some implementations, the electrode assembly further includes a separator provided between a positive electrode and a negative electrode.

In some implementations, the spacer is a separator. The type of the separator is not particularly limited in this application, and any well-known porous separator with good chemical stability and mechanical stability may be used.

As an example, the main material of the separator may be selected from at least one of glass fiber, non-woven fabric, polyethylene, polypropylene, polyvinylidene fluoride, and ceramics.

In some implementations, the spacer is a solid electrolyte. The solid electrolyte is disposed between the positive electrode and the negative electrode, and serves to transfer ions and separate the positive electrode and negative electrode.

In some implementations, the battery cell further comprises an electrolyte that functions to conduct ions between the positive electrode and negative electrode. The type of the electrolyte is not specifically limited in this application, and may be selected according to a requirement. The electrolyte may be liquid, gel, or solid.

In some implementations, the electrode assembly is a wound structure. The positive electrode plate and the negative electrode plate are wound in a winding structure.

In some implementations, the electrode assembly is a laminated structure.

As an example, a plurality of positive electrode plates and a plurality of negative electrode plates may be provided, and are alternately laminated.

As an example, a plurality of positive electrode plates may be provided, the negative electrode plate may be folded to form a plurality of laminated folding sections, and one positive electrode plate is sandwiched between adjacent folding sections.

As an example, the positive electrode plate and negative electrode plate are both folded to form a plurality of laminated folding sections.

As an example, a plurality of spacers may be provided, between any adjacent positive electrode plates or negative electrode plates respectively.

As an example, the spacer may be continuously provided between any adjacent positive electrode plates or negative electrode plates by folding or winding.

In some embodiments, the electrode assembly may have a cylindrical shape, a flat shape, a polygonal column shape, or the like.

In some implementations, the electrode assembly is provided with a tab that may conduct current from the electrode assembly. The tab includes a positive tab and a negative tab.

In some implementations, the battery cell may include a housing. The housing is used to enclose components such as the electrode assembly and the electrolyte. The housing may be a steel housing, an aluminum housing, a plastic housing (e.g., polypropylene), a composite metal housing (e.g., a copper-aluminum composite housing), an aluminum plastic film, or the like. The housing includes a case and a cover plate.

As an example, the battery cell may be a cylindrical battery cell, a prismatic battery cell, a pouch battery cell, or an another shaped battery cell, and the prismatic battery cell includes a square-housing battery cell, a blade-shaped battery cell, and a multi-prism battery cell, for example, a hexagonal battery cell, and the like, and the present application is not particularly limited.

A battery mentioned in the embodiments of the present application refers to a single physical module including one or a plurality of battery cells to provide a higher voltage and capacity. When there are a plurality of battery cells, the plurality of battery cells are connected in series, in parallel, or in series-parallel via a busbar component.

In some embodiments, the battery may be a battery module, and when there are a plurality of battery cells, the plurality of battery cells are arranged and fixed to form a battery module.

In some embodiments, the battery may be a battery pack including a box and a battery cell, and the battery cell or the battery module is accommodated in the box.

In some embodiments, the box may be a part of a chassis structure of a vehicle. For example, a part of the box may be at least a part of a floor of a vehicle, or a part of the box may be at least a part of a cross beam and a side beam of a vehicle.

At present, the battery cell mainly includes a housing and an electrode assembly provided in the housing, the housing is provided with an electrode terminal, and the electrode assembly is provided with a tab, and the tab is directly or indirectly electrically connected to the electrode terminal to extract the electric energy inside the battery cell to the outside of the battery cell.

In order to protect the tab, the tab is covered with an insulating member in the related art. In addition, if the insulating member is entirely adhered to the tab, the tab adhered to the insulating member may be torn when the tab is bent.

In view of this, the embodiments of the present application provide a battery cell, and a transition portion of a tab is not fixed to the insulating member, to help resolve a problem of tab tearing caused by an adhesive force between the insulating member and the tab when the tab is bent.

The technical solutions described in the embodiments of the present application are all applicable to various devices using batteries, for example, a mobile phone, a portable device, a notebook computer, an electric vehicle, an electric toy, an electric tool, an electric vehicle, a ship, and a spacecraft, and for example, the spacecraft includes an aircraft, a rocket, a space shuttle, and a spacecraft.

It should be understood that the technical solutions described in the embodiments of the present application are not limited to the devices described above, but may be applied to all devices using a battery, but for brevity of description, the following embodiments are described by using an electric vehicle as an example.

Figure 1:
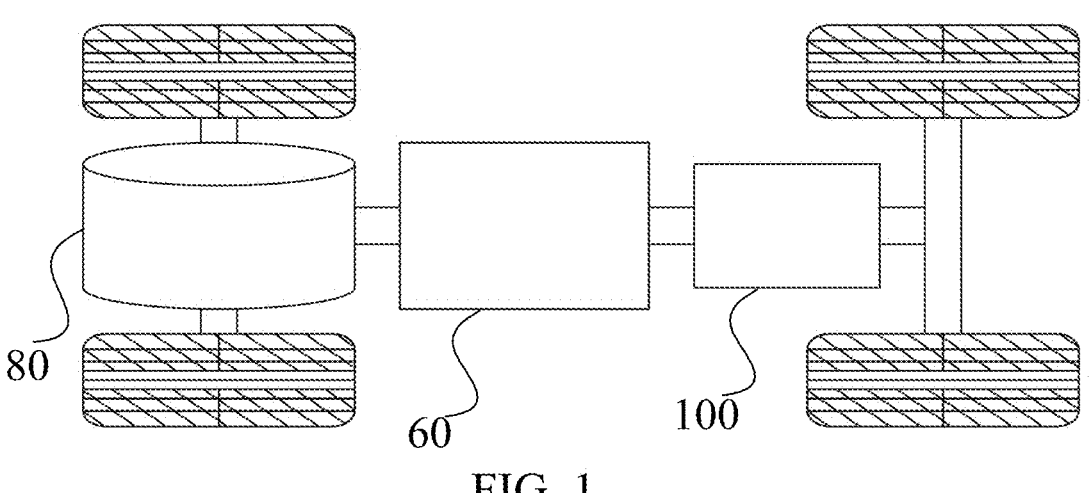
FIG. 1 is a schematic structural diagram of a vehicle according to embodiments of the present application.

For example, as shown in FIG. 1, FIG. 1 is a schematic structural diagram of a vehicle 1 according to an embodiment of the present application. The vehicle 1 may be a fuel vehicle, a gas vehicle, or a new energy vehicle, and the new energy vehicle may be a battery electric vehicle, a hybrid vehicle, or a range-extended electric vehicle, or the like. A motor 80, a controller 60, and a battery 100 may be arranged inside the vehicle 1. The controller 60 is configured to control the battery 100 to supply power to the motor 80. For example, the battery 100 may be arranged at the bottom or at the head or at the tail of the vehicle 1. The battery 100 may be configured to supply power to the vehicle 1, for example, the battery 100 may be used as an operating power source for the vehicle 1, used for a circuit system of the vehicle 1, for example, used for operating power requirements for starting, navigation, and running of the vehicle 1. In another embodiment of the present application, the battery 100 may be used not only as the operating power source of the vehicle 1, but also as a driving power source of the vehicle 1, instead of or partially instead of fuel or natural gas to provide driving power to the vehicle 1.

Figure 2:
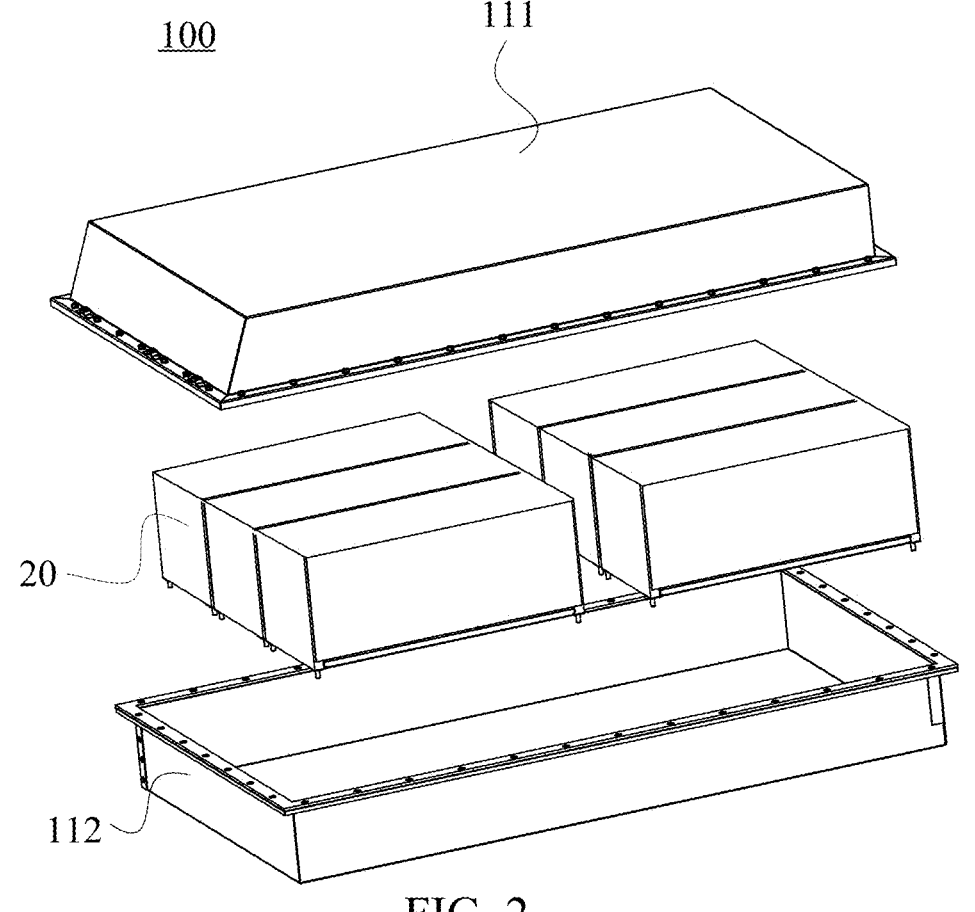
FIG. 2 is a schematic structural diagram of a battery according to an embodiment of the present application.

For example, FIG. 2 is a schematic structural diagram of a battery 100 according to an embodiment of the present application. The battery 100 may include a plurality of battery cells 20. In addition to the battery cells 20, the battery 100 may further include a box having a hollow structure inside, and the plurality of battery cells 20 may be accommodated in the box. As shown in FIG. 2, the box may include two portions, which are referred to as a first box portion 111 and a second box portion 112, respectively, and the first box portion 111 and the second box portion 112 are buckled together. The shapes of the first box portion 111 and the second box portion 112 may be determined according to the combined shape of the plurality of battery cells 20, and at least one of the first box portion 111 and the second box portion 112 has an opening. For example, as shown in FIG. 2, only one of the first box portion 111 and the second box portion 112 may be a hollow cuboid having an opening, and the other may be a plate to cover the opening. Here, taking an example in which the second box portion 112 is a hollow cuboid with only one surface being an opening surface and the first box portion 111 is a plate as an example, the first box portion 111 covers the opening of the second box portion 112 to form a box 11 having a closed chamber which may be configured to accommodate a plurality of battery cells 20. The plurality of battery cells 20 combined through series connection, parallel connection or parallel-series connection with each other are arranged in the box formed by buckling the first box portion 111 and the second box portion 112.

For example, different from FIG. 2, the first box portion 111 and the second box portion 112 each may be a hollow cuboid with only one surface being an opening surface, an opening of the first box portion 111 and an opening of the second box portion 112 are formed to face each other, and the first box portion 111 and the second box portion 112 are buckled with each other to form the box having a closed chamber. The plurality of battery cells 20 combined through series connection, parallel connection or parallel-series connection with each other are arranged in the box formed by buckling the first box portion 111 and the second box portion 112.

Figure 3:
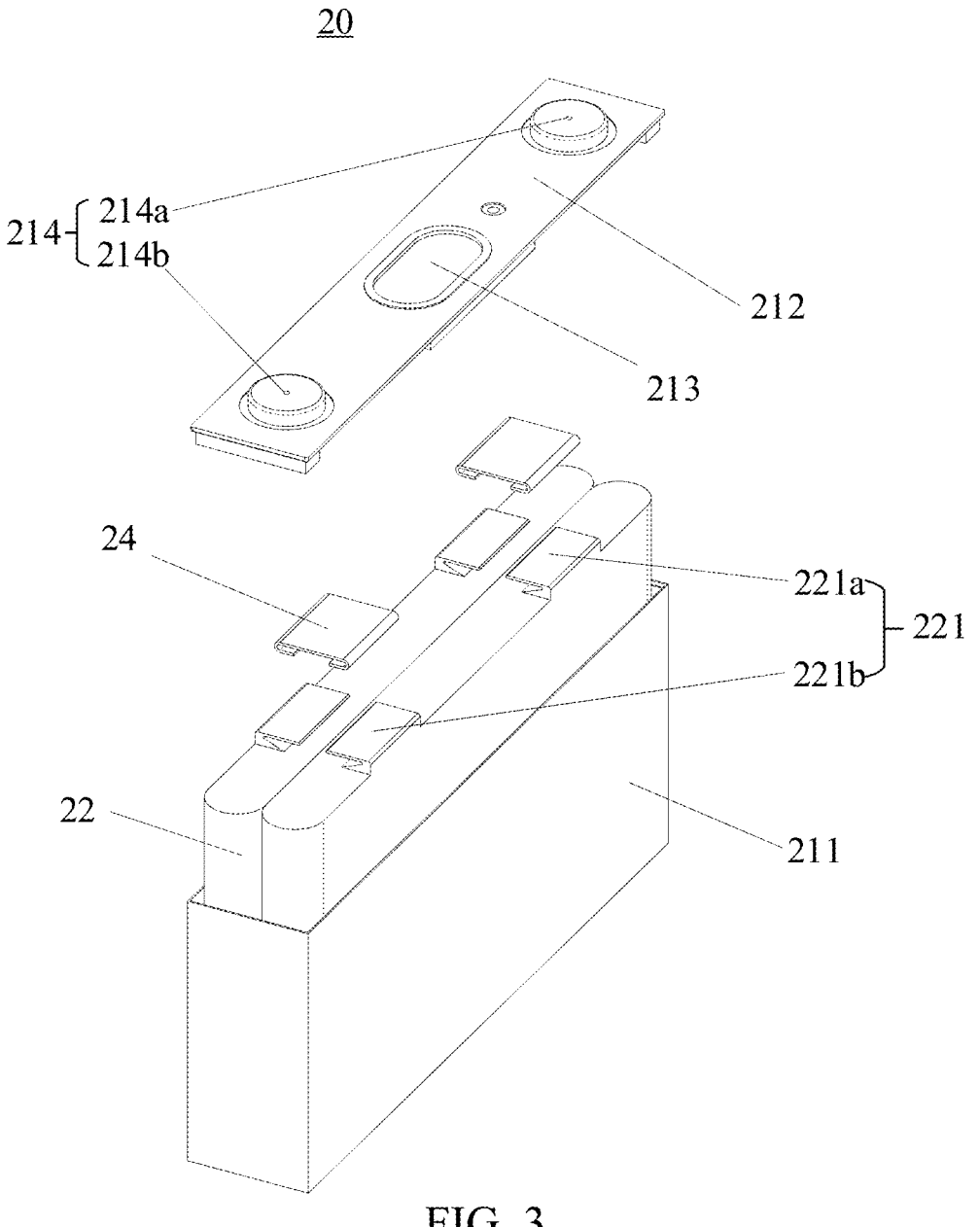
FIG. 3 is a schematic exploded view of a battery cell according to an embodiment of the present application.
Figure 4:
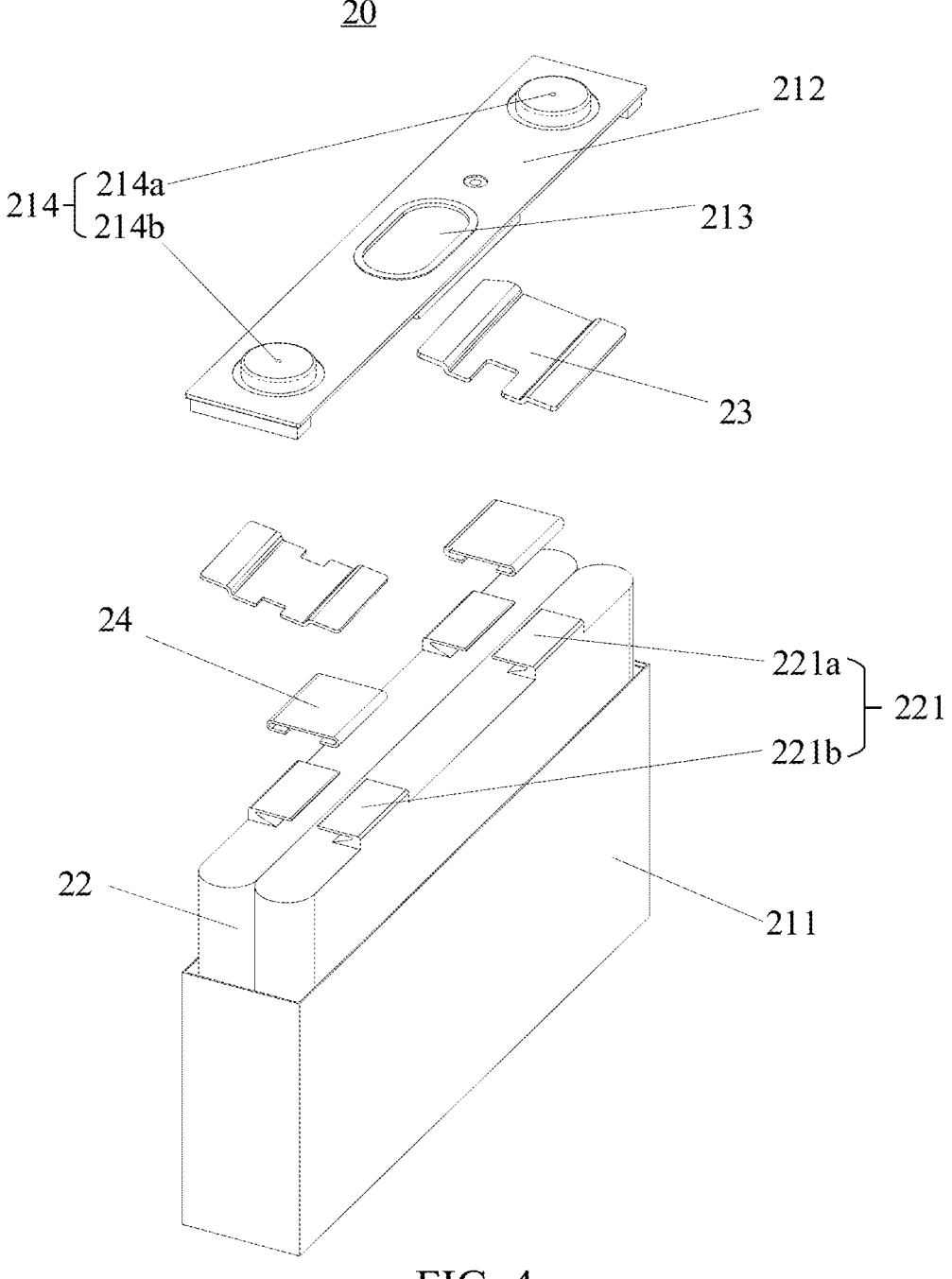
FIG. 4 shows a schematic exploded view of a battery cell according to another embodiment of the present application.

FIG. 3 shows a schematic exploded view of a battery cell 20 according to an embodiment of the present application. FIG. 4 shows a schematic exploded view of a battery cell 20 according to another embodiment of the present application.

As shown in FIGS. 3 and 4, the battery cell 20 includes one or more electrode assemblies 22, a case 211 and a cover plate 212, where both a wall of the case 211 and the cover plate 212 are all referred to as a wall of the battery cell 20. The case 211 depends on the shape of the assembled one or more electrode assemblies 22, for example, the case 211 may be a hollow cuboid, cube or cylinder, and one of the faces of the case 211 has an opening so that the one or more electrode assemblies 22 can be placed in the case 211. For example, when the case 211 is a hollow cuboid or cube, one of the planes of the case 211 is an open face, that is, the plane does not have a wall, so that the inside and outside of the case 211 are connected. When the case 211 may be a hollow cylinder, an end face of the case 211 is an open face, that is, the end face has no wall, so that the inside and outside of the case 211 are connected. The cover plate 212 covers the opening and is connected to the case 211 to form a closed cavity in which the electrode assembly 22 is placed. The case 211 is filled with an electrolyte, for example, an electrolytic solution.

The battery cell 20 further includes two electrode terminals 214. The cover plate 212 is generally in the shape of a flat plate, and two electrode terminals 214 are fixed to the flat plate surface of the cover plate 212, and the two electrode terminals 214 are a positive electrode terminal 214a and a negative electrode terminal 214b, respectively.

As shown in FIGS. 3 and 4, each electrode assembly 22 has a tab 221, including a first tab 221a and a second tab 221b. The first tab 221a and the second tab 221b have opposite polarities. When the first tab 221a is a positive tab, the second tab 221b is a negative tab. For example, as shown in FIG. 3, the first tab 221a of one or more electrode assemblies 22 is connected to the positive electrode terminal 214a, and the second tab 221b of one or more electrode assemblies 22 is connected to the negative electrode terminal 214b. For another example, as shown in FIG. 4, the first tab 221a of one or more electrode assemblies 22 is connected to the positive electrode terminal 214a through one connection member 23, and the second tab 221b of one or more electrode assemblies 22 is connected to the negative electrode terminal 214b through another connection member 23.

As an example, a pressure relief mechanism 213 may be further provided on one wall of the battery cell 20. The pressure relief mechanism 213 is used to actuate when the internal pressure or temperature of the battery cell 20 reaches a threshold value to release the internal pressure or temperature.

Alternatively, the pressure relief mechanism 213 may be provided on the cover plate 212, or may be provided on any wall of the case 211.

As shown in FIGS. 3 and 4, the battery cell 20 further includes an insulating member 24, and the insulating member 24 is provided on a side of the tab 221 away from the cover plate 212 and is fixedly connected to the tab 221 to play an insulating role.

Figure 5:
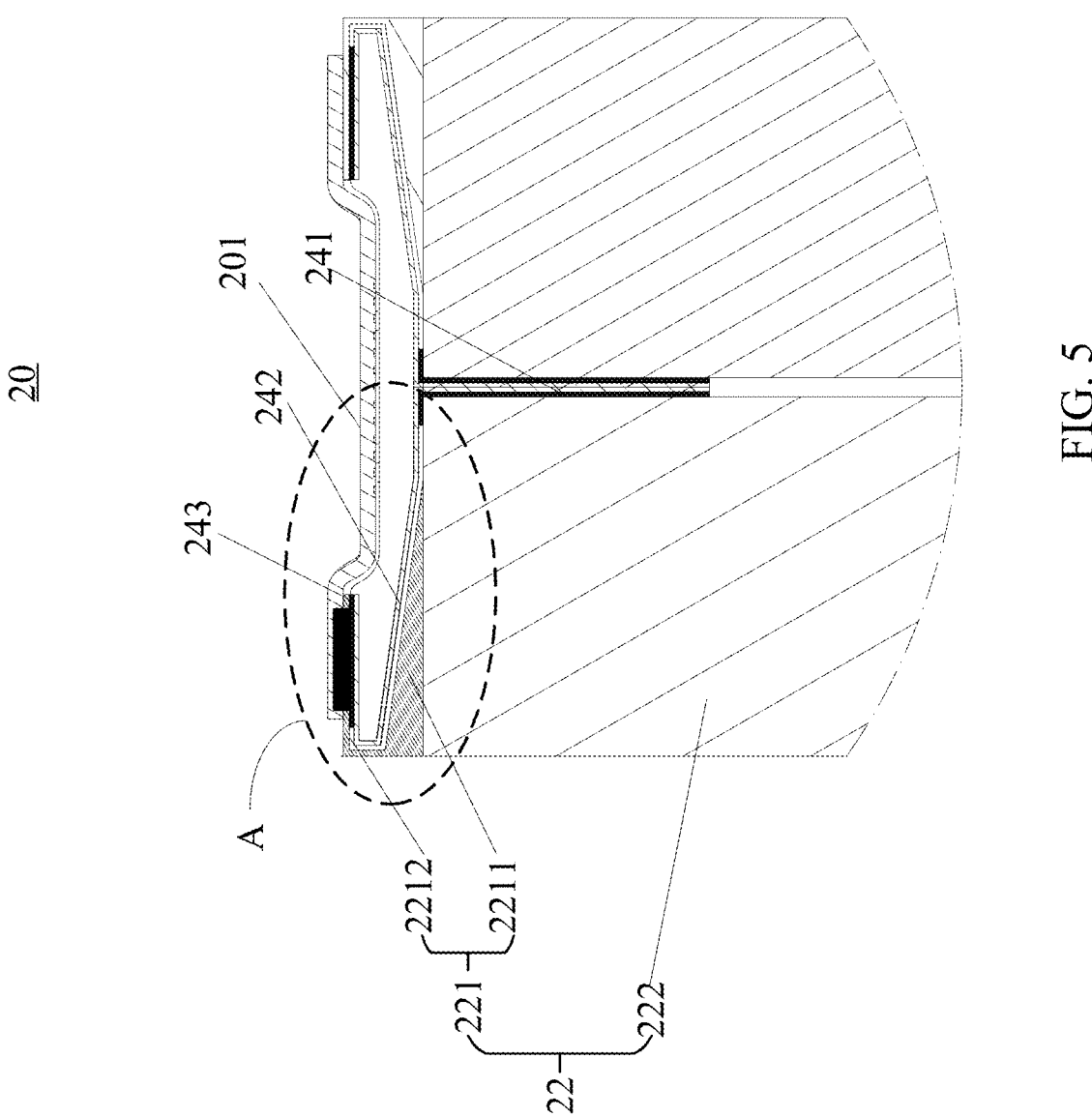
FIG. 5 shows a schematic cross-sectional view of a battery cell according to an embodiment of the present application.
Figure 6:
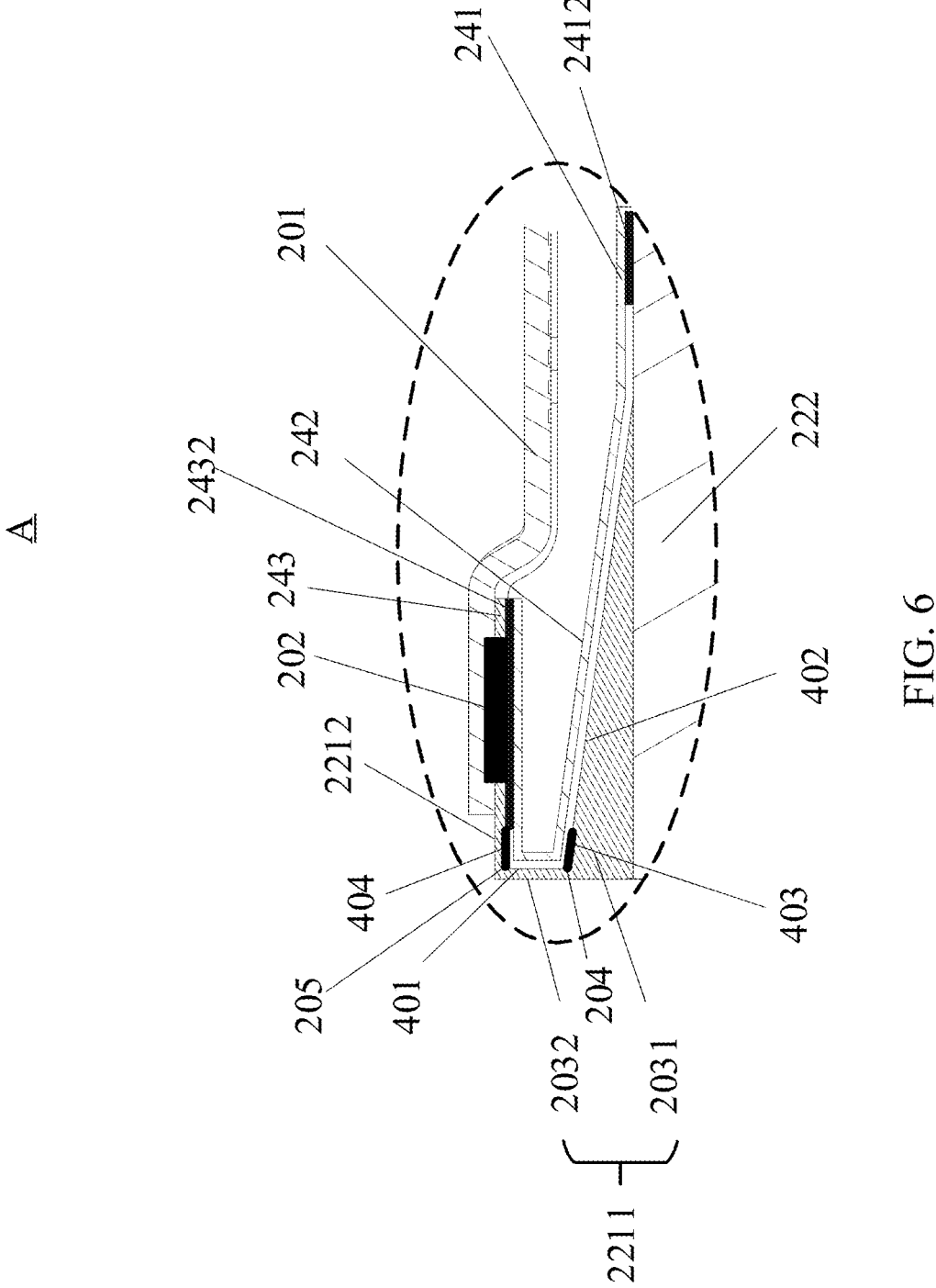
FIG. 6 shows a schematic enlargement of part A of FIG. 5.
Figure 7:
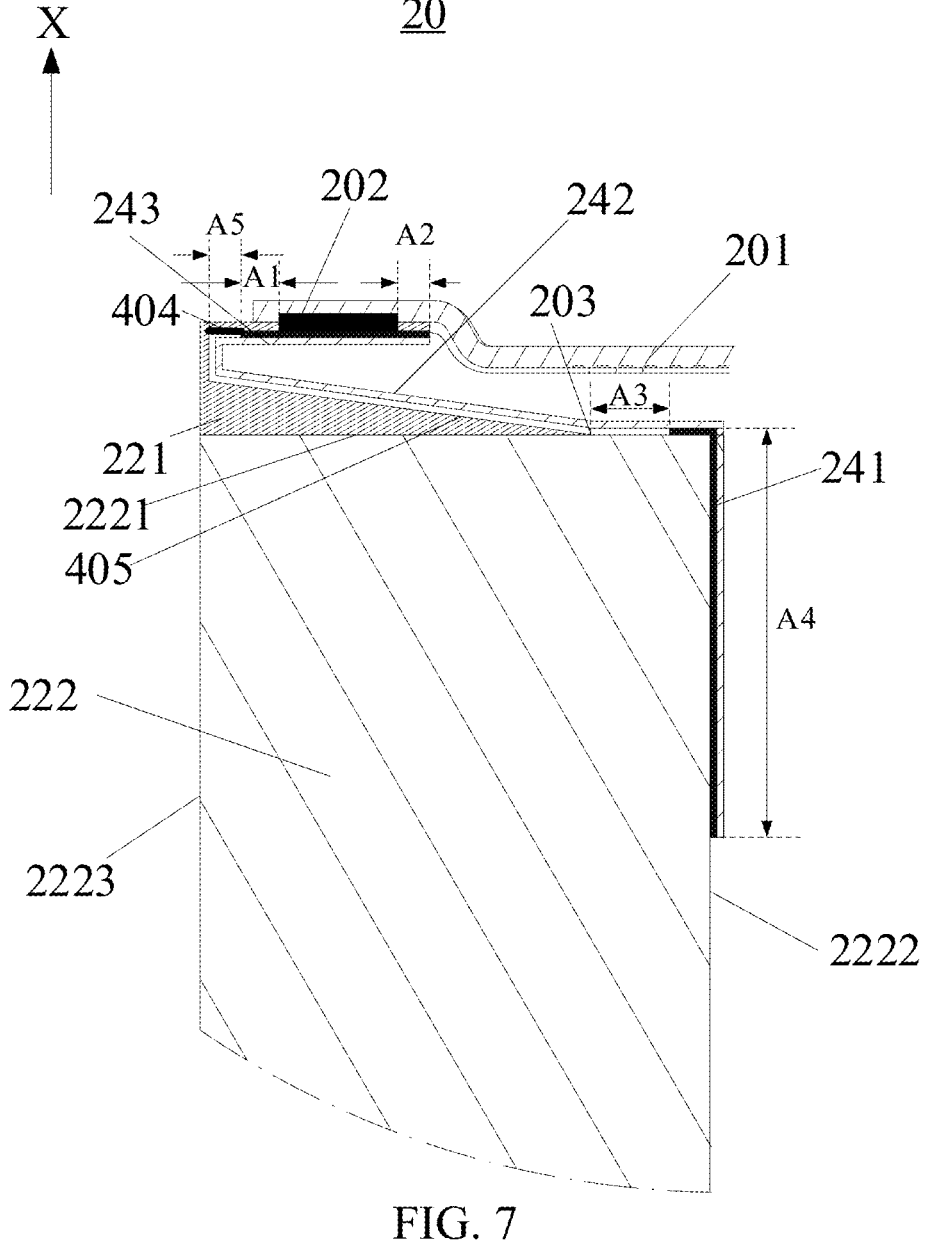
FIG. 7 shows another schematic cross-sectional view of a battery cell according to an embodiment of the present application.

FIG. 5 shows a cross-sectional view of a battery cell 20 according to an embodiment of the present application. FIG. 6 is an enlarged schematic diagram of a portion A in FIG. 5. FIG. 7 is another cross-sectional view of a battery cell 20 according to an embodiment of the present application. As shown in FIG. 5, the battery cell 20 includes an electrode extraction portion 201 configured to extract electric energy of the battery cell 20, an electrode assembly 22 including a main body 222 and a tab 221, where the tab 221 includes a transition portion 2211 and a connection portion 2212, the connection portion 2212 is bent relative to the transition portion 2211 which is connected between the main body 222 and the connection portion 2212, the connection portion 2212 is configured to be connected to the electrode extraction portion 201; and an insulating member 24 provided on an inner side of the bent tab 221, where the insulating member 24 includes a first insulator 241 fixed to the main body 222 and a third insulator 243 fixed to the connection portion 2212, the insulating member 24 further includes a second insulator 242 connected between the first insulator 241 and the third insulator 243, and at least a part of the transition portion 2211 is not fixed to the insulating member 24.

It should be understood that the electrode extraction portion 201 is configured to extract the electric energy of the battery cell 20 to the outside of the battery cell 20, and is connected in series or in parallel with other battery cells. The electrode extraction portion 201 may include an electrode terminal 214 as shown in FIG. 3, where the tab 221 is directly electrically connected to the electrode terminal 214, or the electrode extraction portion 201 may include an electrode terminal 214 and a connection member 23 as shown in FIG. 4, where the tab 221 is electrically connected to the electrode terminal 214 through the connection member 23. In some embodiments, the welding region 202 may be formed after the connection portion 2212 of the tab 221 is welded to the electrode extraction portion 201.

Generally, the electrode assembly 22 is formed by overlapping a plurality of electrode plates, each electrode plate includes a current collector and an active material coated on a surface of the current collector, where a portion coated with the active material may be understood as a main body 222 of the electrode assembly 22, and a portion not coated with the active material may be understood as a tab 221 of the electrode assembly 22, that is, the portions of the plurality of electrode plates coated with the active material form the main body 222, and the portions of the plurality of electrode plates not coated with the active material form the tab 221. In addition, since each electrode plate has a portion not coated with the active material, the portions of the plurality of electrode plates not coated with the active material need to be gathered before being electrically connected to the electrode extraction portion 201. The portions of the plurality of electrode plates that are not coated with the active material are gathered and then bent to form the transition portion 2211 and the connection portion 2212, and the connection portion 2212 is bent relative to the transition portion 2211.

In some embodiments, as shown in FIG. 7, the tab 221 may be formed extending from the first end face 2221 of the main body 222. After bending, the connection portion 2212 of the tab 221 may be provided opposite to the first end face 2221.

It should be noted that the insulating member 24 is provided on the inner side of the bent tab 221, which may be understood as that the insulating member 24 is provided on a side of the tab 221 away from the electrode extraction portion 201.

In an example, the tab 221 is formed by extending from a portion of the first end face 2221 of the main body 222. In this example, the first insulator 241 is fixed to a part of the first end face 2221 from which the tab 221 is not extracted and a part of the first side face 2222 intersecting with the first end face 2221, and the first insulator 241 fixed to the part of the first end face 2221 from which the tab 221 is not extracted and the first insulator 241 of the part of the first side face 2222 intersecting with the first end face 2221 are connected. The third insulator 243 may be fixed to at least a part of the connection portion 2212 in the welding region 202. The second insulator 242 is connected between the first insulator 241 and the third insulator 243, and a surface of the second insulator 242 facing the tab 221 is exposed.

In another example, the tab 221 is formed by extending from the entire first end face 2221 of the main body 222. In this example, the first insulator 241 may be fixed to only a part of the first side face 2222 intersecting the first end face 2221, and the projection of the second insulator 242 on the first end face 2221 covers almost the entire first end face 2221.

In some embodiments, the exposed portion of the surface of the insulating member 24 facing the tab 221 may only cover a portion of the transition portion 2211. In other embodiments, the exposed portion of the surface of the insulating member 24 facing the tab 221 may also cover the entire transition portion 2211.

In the embodiment of the present application, the second insulator 242 is provided between the first insulator 241 and the third insulator 243 to connect the first insulator 241 and the third insulator 243 together, which can improve the connection strength of the first insulator 241 and the third insulator 243 on the electrode assembly 22 and a risk of detachment can be reduced. In addition, by not fixing at least a part of the transition portion 2211 of the tab 221 to the insulating member 24, the tensile force of the insulating member 24 on the tab 221 can be reduced during the bending process of the tab 221, which is beneficial to reduce tab tearing when the tab 221 is bent.

In some embodiments, at least a part of the transition portion 2211 is not fixed to the second insulator 242.

As shown in FIGS. 5 to 7, the second insulator 242 covers at least a part of the transition portion 2211, and therefore, at least a part of the transition portion 2211 is not fixed to the insulating member 24, which may also be understood as that at least a part of the transition portion 2211 is not fixed to the second insulator 242.

In the present embodiment, by not fixing at least a part of the transition portion 2211 of the tab 221 to the second insulator 242, the tab 221 can release the stress during the bending process of the tab 221, thereby reducing the tensile force applied by the insulating member 24 to the tab 221 and reducing the risk of breakage of the tab 221.

In some embodiments, as shown in FIG. 6, the transition portion 2211 includes a first portion 2031 and a second portion 2032, the first portion 2031 is connected to the main body 222, the second portion 2032 is connected between the connection portion 2212 and the first portion 2031, an inner surface 402 of the second portion 2032 is bent relative to the inner surface 401 of the first portion 2031, and the second portion 2032 is not fixed to the second insulator 242.

It should be noted that the inner surface 401 of the second portion 2032 being bent relative to the inner surface 402 of the first portion 2031 may also mean that there is an included angle between the inner surface 401 of the second portion 2032 and the inner surface 402 of the first portion 2031.

In some embodiments, as shown in FIGS. 5 to 7, the outer surface of the second portion 2032 and the outer surface of the first portion 2031 may be in the same plane, for example, the outer surface of the second portion 2032 and the outer surface of the first portion 2031 may be in the same plane as the second side face 2223 of the main body 222.

In the present embodiment, since the second portion 2032 is connected to the connection portion 2212 and the first portion 2031 at bending points, the second portion 2032 is not fixed to the second insulator 242, so that the tensile force of the insulating member 24 on the bending portion of the tab 221 can be released as much as possible, and the risk of tearing the tab 221 can be reduced as much as possible when the tab 221 is bent.

In some embodiments, as shown in FIG. 6, the first edge portion 403 of the first portion 2031 connected to the second portion 2032 is not fixed to the second insulator 242, and/or the second edge portion 404 of the connection portion 2212 connected to the second portion 2032 is not fixed to the second insulator 242.

In other words, in the direction perpendicular to the first side face 2222, the third insulator 243 is spaced apart from the bending point 205 between the transition portion 2211 and the connection portion 2212, and/or, in the direction perpendicular to the first side face 2222, the first insulator 241 is spaced apart from the second connection 204 between the first portion 2031 and the second portion 2032.

It should be noted that, for ease of illustration, FIG. 6 only indicates that the edge of the inner surface 402 of the first portion 2031 is used as the first edge portion 403, and the edge of the inner surface of the connection portion 2212 is used as the second edge portion 404, but a person skilled in the art should understand that the first edge portion 403 and the second edge portion 404 should be three size al structures.

In the present embodiment, not only the second portion 2032 is configured not to be fixed to the second insulator 242, but also the first edge portion 403 of the first portion 2031 connected to the second portion 2032 is configured not to be fixed to the second insulator 242, and/or the second edge portion 404 of the connection portion 2212 connected to the second portion 2032 is configured not to be fixed to the second insulator 242, which can better release the tensile force applied by the insulating member 24 to the tab 221, and reduce the risk of breakage of the tab 221.

In other embodiments, the entire transition portion 2211 is not fixed to the second insulator 242.

That is, not only the second portion 2032 of the transition portion 2211 but also the first portion 2031 of the transition portion 2211 is not fixed to the second insulator 242.

In the present embodiment, by arranging the entire transition portion 2211 not to be fixed to the second insulator 242, the tensile force applied by the insulating member 24 to the tab 221 can be released more during the bending process of the tab 221, and the risk of breakage of the tab 221 are reduced.

In some embodiments, the connection portion 2212 is welded with the electrode extraction portion 201 and forms a welding region 202, the welding region 202 is exposed on a side of the connection portion 2212 close to the main body 222, and the third insulator 243 covers the welding region 202.

For example, an orthographic projection of the welding region 202 on the first end face 2221 is located within an orthographic projection of the third insulator 243 on the first end face 2221.

In some embodiments, the connection portion 2212 and the electrode extraction portion 201 may be connected by ultrasonic welding. For example, the welding head is provided on a side of the connection portion 2212 away from the electrode extraction portion 201, a welding base is provided on a side of the electrode extraction portion 201 away from the connection portion 2212, and when the connection portion 2212 and the electrode extraction portion 201 are welded, the welding head and the welding base clamp the connection portion 2212 and the electrode extraction portion 201, and form a welding region 202 between the electrode extraction portion 201 and the connection portion 2212, and the welding region 202 may be exposed to a surface of the connection portion 2212 close to the main body 222.

In the present embodiment, the third insulator 243 is configured to cover the welding region 202, so that the third insulator 243 can fix the metal debris in the welding region 202 at the welding region 202, which is beneficial to reducing the probability of short circuit of the battery cell 20 caused by escape of the metal debris.

In some embodiments, the third insulator 243 exceeds the welding region 202.

It should be noted that although FIG. 7 only shows that the third insulator 243 exceeds the welding region 202 in the direction perpendicular to the first side face 2222, a person skilled in the art understands that the third insulator 243 exceeding the welding region 202 in the present embodiment of the present application may mean that the third insulator 243 exceeds the welding region 202 in all directions on the plane parallel to the first end face 2221.

In the present embodiment, the third insulator 243 is configured to exceed the welding region 202, the metal debris in the welding region 202 can be enclosed in the welding region 202, thereby reducing the probability of short circuit of the battery cell 20 caused by escape of the metal debris.

In some embodiments, the size of the third insulator 243 exceeding the welding region 202 is greater than or equal to 2 mm.

In some examples, the size of the third insulator 243 exceeding the welding region 202 is equal to 2 mm, 3 mm, or the like. For example, A1 in FIG. 7 is equal to 3 mm. For another example, A2 in FIG. 7 is equal to 2 mm.

In some embodiments, as shown in FIG. 7, the tab 221 extend from the first end face 2221 of the main body 222, the first insulator 241 is spaced apart from the first connection 203, and the first connection 203 is a connection between the inner surface 405 of the tab 221 and the first end face 2221.

First, it should be explained that the inner surface 405 of the electrode tab 221 may include the inner surface 402 of the first portion 2031, the inner surface 401 of the second portion 2032, and the inner surface of the connection portion 2212. In addition, as described above, the tab 221 may be formed to extend from a portion of the first end face 2221 of the main body 222, and the first insulator 241 may fix the portion of the first end face 2221. In the present embodiment of the present application, the second insulator 242 may exceed the first connection 203, so that the second insulator 242 may also cover a part of the first end face 2221, and a part of the first end face 2221 may not be fixed to the insulating member 24.

In the present embodiment, since the first connection 203 is a stress concentration point between the tab 221 and the main body 222, the first insulator 241 is spaced apart from the first connection 203, so that the first connection 203 can be covered by the second insulator 242 and is not fixed to the insulating member 24, thereby reducing the tensile force applied by the insulating member 24 to the first connection 203 during the bending process of the tab 221, and further reducing the risk of breakage of the tab 221.

In some embodiments, the distance between the first insulator 241 and the first connection 203 is greater than or equal to 2 mm.

In some examples, the distance between the first insulator 241 and the first connection 203 is equal to 2 mm, 3 mm, or the like. For example, A3 in FIG. 7 is equal to 2 mm.

In the present embodiment, by arranging the distance between the first insulator 241 and the first connection 203 to be greater than or equal to 2 mm, the tensile force applied by the insulating member 24 to the tab 221 can be further reduced, thereby reducing the risk of breakage of the tab 221.

In some embodiments, in the first direction X, a size A4 of the first insulator 241 fixed to the first side face 2222 of the main body 222 is less than a size L of the coating thinned region of the electrode plate in the electrode assembly 22, the first side face 2222 is perpendicular to the first end face 2221, the first direction X is perpendicular to the first end face 2221, and the first end face 2221 is an end face of the main body 222 connected to the tab 221.

Figure 8:
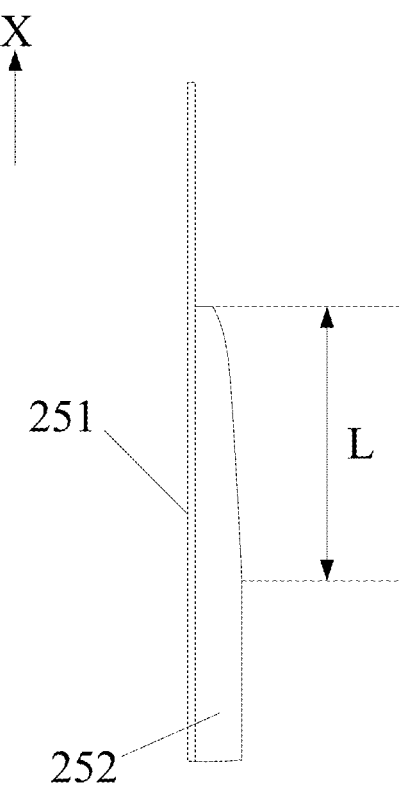
FIG. 8 shows a side view of one of the electrode plate in an electrode assembly before bending.

FIG. 8 shows a side view of one of the electrode plate in an electrode assembly 22 before bending. As can be seen from FIG. 8, the region where the current collector 251 coated with the active material 252 is located and connected to the region where the current collector 251 not coated with the active material 252 is located includes a transition region, and the thickness of the active material 252 in the transition region gradually decreases, and the transition region may be referred to as a coating thinned region. A plurality of electrode plates shown in FIG. 8 are overlapped to form a structure of the electrode assembly before the tab 221 is folded in FIGS. 5 to 7.

Generally, the first insulator 241 extends from the connection between the first side face 2222 and the first end face 2221 in a direction away from the first end face 2221, and extends to a position not exceeding the coating thinned region of the electrode plate.

In the present embodiment, in the first direction X, the size A4 of the first insulator 241 fixed to the first side face 2222 of the main body 222 is set to be smaller than the size L of the coating thinned region of the electrode plate in the electrode assembly 22, which can reduce the influence of the attachment of the insulating member 24 on the performance of the battery cell 20.

In some embodiments, as shown in FIG. 7, in the direction perpendicular to the first side face 2222, the size A5 of the second edge portion 404 may also be greater than or equal to 2 mm.

Figure 9:
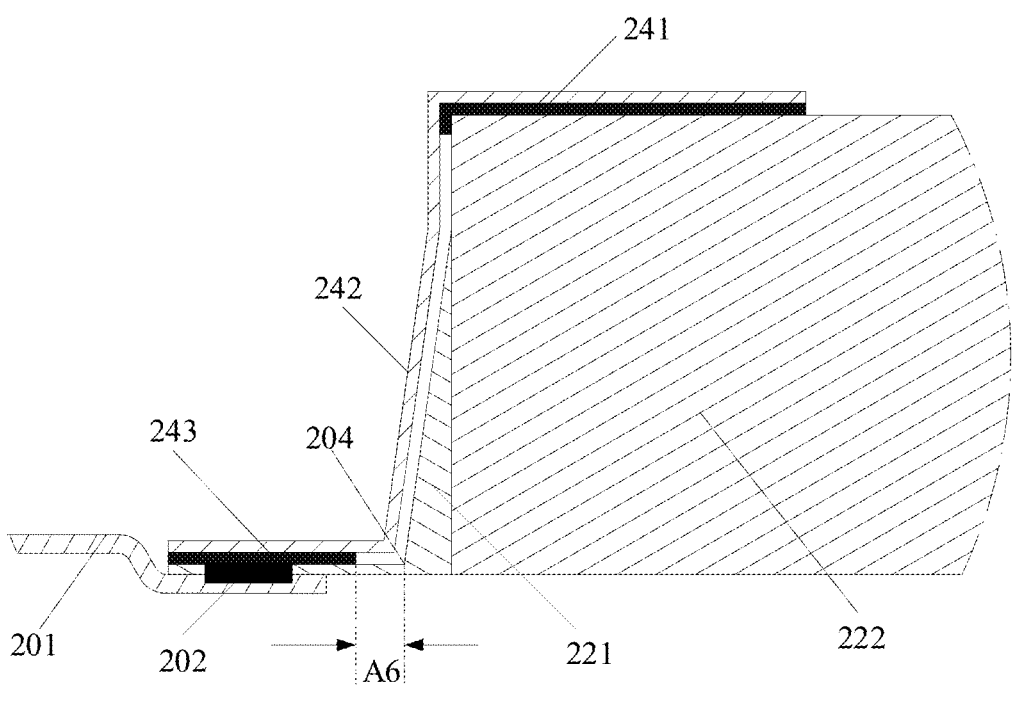
FIG. 9 shows a schematic cross-sectional view of a battery cell before bending of a tab according to an embodiment of the present application.

FIG. 9 shows a cross-sectional view of the battery cell 20 before the tab 221 is bent in FIGS. 5 to 7. As shown in FIG. 9, a distance A6 from the third insulator 243 to the second connection 204 is greater than or equal to 2 mm, and the second connection 204 may be a connection between the first portion 2031 and the second portion 2032. The distance A6 between the third insulator 243 and the second connection 204 should ensure that the second portion 2032 of the bent tab 221 is not fixed to the second insulator 242, and further, it can also ensure that the second edge portion 404 of the connection portion 2212 is not fixed to the second insulator 242.

FIG. 10 is a schematic cross-sectional view of an insulating member 24 in an unfolded state according to an embodiment of the present application. FIG. 11 is a schematic cross-sectional view of another insulating member 24 in an unfolded state according to an embodiment of the present application.

As shown in FIG. 10, the first insulator 241 includes a first insulating layer 2411 and a first adhesive coating 2412, the third insulator 243 includes a third insulating layer 2431 and a third adhesive coating 2432, the first insulating layer 2411 is bonded to the main body 222 by the first adhesive coating 2412, the third insulating layer 2431 is bonded to the connection portion 2212 by the third adhesive coating 2432, the second insulator 242 includes a second insulating layer 2421, and a surface of the second insulating layer 2421 facing the tab 221 is exposed.

It should be understood that the surface of the second insulating layer 2421 facing the tab 221 is exposed, which may be understood as that the side of the second insulating layer 2421 facing the tab 221 is not provided with an adhesive coating.

In the present embodiment, by exposing the surface of the second insulating layer 2421 facing the tab 221, it can be achieved that at least a part of the transition portion 2211 of the tab 221 is not fixed to the second insulator 242, thereby reducing the tensile force applied by the insulating member 24 to the tab 221 during the bending process of the tab 221, and reducing the risk of breakage of the tab 221. In addition, the material used for the adhesive coating can be reduced, and the cost can be reduced.

As shown in FIG. 11, the first insulator 241 includes a first insulating layer 2411 and a first adhesive coating 2412, the second insulator 242 includes a second insulating layer 2421 and a second adhesive coating 2422, the third insulator 243 includes a third insulating layer 2431 and a third adhesive coating 2432, the second insulator 242 further includes a fourth insulating layer 2423 which is bonded to the second insulating layer 2421 by using the second adhesive coating 2422, and a surface of the fourth insulating layer 2423 facing the tab 221 is exposed.

It should be understood that the surface of the fourth insulating layer 2423 facing the tab 221 is exposed, which may be understood as that the side of the fourth insulating layer 2423 facing the tab 221 is not provided with an adhesive coating.

In the present embodiment, by bonding the fourth insulating layer 2423 to the second adhesive coating 2422 and exposing the surface of the fourth insulating layer facing the tab 221, it can be achieved that the portion of the tab 221 from the first connection 203 to the second connection 204 is not fixed to the second insulator 242, thereby reducing the tensile force applied by the insulating member 24 to the tab 221 during the bending process of the tab 221, and reducing the risk of breakage of the tab 221. In addition, it is only necessary to attach the fourth insulating layer 2423 at a position corresponding to at least a part of the transition portion 2211 of the tab 221, which reduces the manufacturing complexity of the insulating member 24.

The material of the insulating layer in the embodiment of the present disclosure may include at least one of PP material, PE material, PET material, and the like. The thickness of the insulating layer and the adhesive coating may be in a range of from 0.001 mm to 0.5 mm, for example, the thickness of the first insulator 241, the thickness of the second insulator 242 excluding the fourth insulating layer 2423 in FIG. 11, and the thickness of the third insulator 243 are all in a range of from 0.001 mm to 0.5 mm.

In some embodiments, the third insulator 243 is spaced apart from the bending point 205, which may also be understood as that the third adhesive coating 2432 is spaced apart from the bending point 205. In some other embodiments, the first insulator 241 and the second connection 204 are spaced apart from each other, which may also be understood as that the first adhesive coating 2412 and the second connection 204 are spaced apart from each other. In other embodiments, the first insulator 241 is spaced apart from the first connection 203, which may also be understood as that the first adhesive coating 2412 is spaced apart from the first connection 203.

In some embodiments, the first insulator 241 and the third insulator 243 are different in color. For example, the first insulator 241 is yellow, and the third insulator 243 is blue. Further, the first insulator 241 and the third insulator 243 may be achieved to be different in color with the difference between the first adhesive coating 2412 and the third adhesive coating 2432 in color.

In some other embodiments, the first insulator 241 and the third insulator 243 are the same in color. For example, the first insulator 241 and the third insulator 243 are both blue. Further, the first insulator 241 and the third insulator 243 may be achieved to be same in color with the first adhesive coating 2412 and the third adhesive coating 2432 being same in color.

In some embodiments, the first insulating layer 2411 in the first insulator 241, the second insulating layer 2421 in the second insulator 242, and the third insulating layer 2431 in the third insulator 243 may be integrally formed. The first insulator 241 fixed to the first end face 2221 is spaced apart from the first connection 203, or may be spaced apart from the first connection 203 by the first adhesive coating 2412 in the first insulator 241. Similarly, the third insulator 243 is spaced apart from the second connection 204, or may be spaced apart from the second connection 204 by a third adhesive coating 2432 in the third insulator 243.

In some other embodiments, at least one of the first insulator 241, the second insulator 242, and the third insulator 243 is formed independently.

In other embodiments, the first insulator 241 may also be fixed to the main body 222 by hot melting, and the third insulator 243 may also be fixed to the connection portion 2212 by hot melting.

As shown in FIG. 3, the electrode extraction portion 201 may include an electrode terminal 214 which is welded to the connection portion 2212, or as shown in FIG. 4, the electrode extraction portion 201 may include an electrode terminal 214 and a connection member 23, the connection portion 2212 is electrically connected to the electrode terminal 214 via the connection member 23, and the connection portion 2212 is welded to the connection member 23.

In the present embodiment, the electrode terminal 214 is directly welded to the connection portion 2212 without being connected by the connection member 23, which can improve the space utilization of the battery cell 20 while reducing the cost. The connection portion 2212 is connected to the electrode terminal 214 through the connection member 23, which facilitates the connection between the tab 221 and the electrode terminal 214.

In some embodiments, the electrode extraction portion 201 may be provided on a first wall of the housing of the battery cell 20, the tab 221 extends from the first end face 2221 of the electrode assembly 22, and the first end face 2221 is provided opposite to the first wall.

Alternatively, the first wall may be any wall of the housing of the battery cell 20, for example, the electrode extraction portion 201 is provided on the cover plate 212 in FIGS. 3 and 4.

In the present embodiment, by providing the electrode extraction portion 201 on the first wall opposite to the first end face 2221, the space occupied by the tab 221 can be greatly saved.

In some embodiments, the battery cell 20 may include a plurality of electrode assemblies 22, for example, include two adjacent electrode assemblies 22, and the two adjacent electrode assemblies 22 may share one electrode extraction portion 201. Moreover, each electrode assembly 22 may be provided with the insulating member 24 as described in the various embodiments described above.

Referring to FIGS. 3 to 11 again, an embodiment of the present application provides a battery cell 20 including an electrode extraction portion 201 configured to extract electric energy of the battery cell 20; an electrode assembly 22 including a main body 222 and a tab 201 extending from a first end face 2221 of the main body 222, the tab 221 including a transition portion 2211 and a connection portion 2212, the transition portion 2211 being connected between the main body 222 and the connection portion 2212, the connection portion 2212 being bent relative to the transition portion 2211, the connection portion 2212 being configured to be welded to the electrode extraction portion and form a welding region 202; and an insulating member 24 provided on a bent inner side of the tab 221, the insulating member 24 including a first insulator 2211 fixed to the main body 222 and a third insulator 243 fixed to the connection portion 2212, the insulating member 24 further including a second insulator 203 connected between the first insulator 241 and the third insulator 243, the transition portion being not fixed to the second insulator 242, a second edge portion 404 of the connection portion 2212 connected to the transition portion 2211 not being fixed to the second insulator 242, the third insulator 243 covering and exceeding the welding region 202, and a distance from the third insulator 243 to a first connection 203 being greater than 2 mm, the first connection being a connection between an inner surface 405 and the first end face 2221 of the tab 221, in a first direction X, the size A4 of the first insulator 241 fixed to a first side face 2222 of the main body 222 being less than the size L of a coating thinned region of an electrode plate in the electrode assembly 22, the first side face 2222 being provided on the first end face 2221, and the first direction X being perpendicular to the first end face 2221.

In the present embodiment, by not fixing the entire transition portion 2211 to the second insulator 242, and not fixing the second edge portion 404 of the connection portion 2212 connected to the transition portion 2211 to the second insulator 242, and the distance from the third insulator 243 to the first connection 203 is greater than or equal to 2 mm, the problem of tearing of the tab 221 caused by the adhesive force between the insulating member 24 and the tab 221 when the tab 221 is bent can be solved. In addition, by providing the third insulator 243 to cover and exceed the welding region 202, the probability of short circuit of the battery cell 20 due to escape of metal debris in the welding region 202 can be reduced.

The present embodiment also provides a battery including the battery cell 20 of the embodiments of the present application.

An embodiment of the present application provides an electric apparatus including the battery in the above embodiments, and the battery is configured to supply electric energy to the electric apparatus.

The electric apparatus may be a vehicle as shown in FIG. 1, or may be any device using the battery.

Although the present application has been described with reference to some preferred embodiments, various modifications to the present application and replacements of the components therein with equivalents can be made without departing from the scope of the present application. In particular, the technical features mentioned in the embodiments may be combined in any manner provided that there is no structural conflict. The present application is not limited to the specific embodiments disclosed herein, but includes all technical solutions falling within the scope of the claims.

The invention claimed is:

1. A battery cell, comprising:
an electrode extraction portion configured to extract electric energy of the battery cell;
an electrode assembly comprising a main body and a tab, wherein the tab comprises a transition portion and a connection portion, the connection portion is bent relative to the transition portion, the transition portion is connected between the main body and the connection portion, and the connection portion is configured to be connected to the electrode extraction portion; and
an insulating member provided on an inner side of the tab, wherein the insulating member comprises a first insulator fixed to the main body and a third insulator fixed to the connection portion, the insulating member further comprises a second insulator connected between the first insulator and the third insulator, and at least a part of the transition portion is not fixed to the insulating member,
wherein the tab extends from a first end face of the main body, the first insulator is provided at a first connection at intervals, and the first connection is a connection between an inner surface of the tab and the first end face, a distance between the first insulator and the first connection is greater than or equal to 2 mm.

2. The battery cell according to claim 1, wherein at least a part of the transition portion is not fixed to the second insulator.

3. The battery cell according to claim 2, wherein the transition portion comprises a first portion and a second portion, the first portion is connected to the main body, the second portion is connected between the connection portion and the first portion, an inner surface of the second portion is bent relative to an inner surface of the first portion, and the second portion is not fixed to the second insulator.

4. The battery cell according to claim 3, wherein a first edge portion of the first portion that is connected to the second portion is not fixed to the second insulator, and/or a second edge portion of the connection portion that is connected to the second portion is not fixed to the second insulator.

5. The battery cell according to claim 2, wherein the entirety of the transition portion is not fixed to the second insulator.

6. The battery cell according to claim 1, wherein the connection portion and the electrode extraction portion are welded and form a welding region exposed to a side of the connection portion near the main body, and the third insulator covers the welding region.

7. The battery cell according to claim 6, wherein the third insulator exceeds the welding region.

8. The battery cell according to claim 1, wherein in a first direction, a size of the first insulator fixed to a first side face of the main body is less than a size of a coating thinned region of an electrode plate in the electrode assembly, the first side face is perpendicular to the first end face, the first direction is perpendicular to the first end face, and the first end face is an end face of the main body that is connected to the tab.

9. The battery cell according to claim 1, wherein the first insulator comprises a first insulating layer and a first adhesive coating, the third insulator comprises a third insulating layer and a third adhesive coating, the first insulating layer is bonded to the main body by using the first adhesive coating, and the third insulating layer is bonded to the connection portion by using the third adhesive coating; and
the second insulator comprises a second insulating layer, and a surface of the second insulating layer facing the tab is exposed.

10. The battery cell according to claim 1, wherein the first insulator comprises a first insulating layer and a first adhesive coating, the second insulator comprises a second insulating layer and a second adhesive coating, the third insulator comprises a third insulating layer and a third adhesive coating, the second insulator further comprises a fourth insulating layer, the fourth insulating layer is bonded to the second insulating layer by using the second adhesive coating, and a surface of the fourth insulating layer facing the tab is exposed.

11. The battery cell according to claim 1, wherein the electrode extraction portion comprises an electrode terminal welded with the connection portion; or,
the electrode extraction portion comprises an electrode terminal and a connection member, the connection portion is electrically connected to the electrode terminal through the connection member, and the connection portion is welded to the connection member.

12. The battery cell according to claim 1, wherein the electrode extraction portion is provided on a first wall of a housing of the battery cell, the tab extends from a first end face of the electrode assembly, and the first end face is provided opposite to the first wall.

13. A battery, comprising the battery cell according to claim 1.

14. An electric apparatus, comprising the battery according to claim 13, wherein the battery is used to provide electric energy to the electric apparatus.

* * * * *